(12) United States Patent
Bubb

(10) Patent No.: US 7,120,577 B2
(45) Date of Patent: *Oct. 10, 2006

(54) VIRTUAL PRESENCE

(75) Inventor: Howard Bubb, Mt. Lakes, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/339,628

(22) Filed: Jan. 9, 2003

(65) Prior Publication Data

US 2004/0204931 A1    Oct. 14, 2004

(51) Int. Cl.
*G10L 21/00* (2006.01)
(52) U.S. Cl. .................................. 704/211; 704/270.1
(58) Field of Classification Search ................ 704/211, 704/270.1, 275
See application file for complete search history.

(56) References Cited

U.S. PATENT DOCUMENTS

| 4,406,001 A | | 9/1983 | Klasco et al. |
| 5,467,388 A | * | 11/1995 | Redd et al. ............. 379/210.02 |
| 5,594,784 A | * | 1/1997 | Velius ...................... 379/88.02 |
| 5,651,054 A | * | 7/1997 | Dunn et al. .............. 379/88.11 |
| 5,717,818 A | * | 2/1998 | Nejime et al. .............. 704/211 |
| 5,822,727 A | | 10/1998 | Garberg et al. |
| 2001/0039568 A1 | | 11/2001 | Murray et al. |

* cited by examiner

*Primary Examiner*—V. Paul Harper
(74) *Attorney, Agent, or Firm*—Blakely, Sokoloff, Taylor & Zafman LLP

(57) ABSTRACT

A system and terminal for facilitating a "virtual presence" allows users on a communication network to simply begin speaking through other users. A system immediately detects the destination party's name, and begins routing the audio signal to a particular destination without any noticeable call set-up. Additionally, the system performs pitch corrected speed control in order to allow the detection and processing of a speech pattern without causing delay to an end user.

16 Claims, 3 Drawing Sheets

VIRTUAL PRESENCE

TECHNICAL FIELD

This invention relates to voice and data communications, and more particularly, to an improved technique of establishing a virtual presence over a communications channel between a first user and a second user.

BACKGROUND OF THE INVENTION

The capacity for voice and data communications has increased dramatically over the last several years. The widespread use of the Internet, as well as the availability of greatly increased bandwidth on most communications media, has led to the ability to communicate large amounts of data from any source through any destination, extremely inexpensively.

Most communications links require an initial set up sequence during which a communications channel is established. For example, in a conventional telephone call, prior to communication taking place, a set-up sequence is required which consists of taking the telephone off hook, dialing a telephone number, making a connection, and taking the called telephone off hook. As is well-known, this takes more than an insignificant amount of time and the process of dialing (addressing) can be quite cumbersome at times.

In data communications, information is typically communicated via packets through packet switches. The packet switches usually establish a virtual circuit between the source and destination. A virtual circuit can be thought of as a system which appears to establish a circuit between two end points by routing packets with a common address to a common destination. There is however, no actual end to end circuit between the source and destination. Packet switched connections allow bandwidth to be utilized efficiently for a plurality of different purposes.

Even in connection with such data communications and virtual circuits, an initial set-up phase is also required. This set-up phase may be in the form of logging onto a computer and waiting for an acknowledgment, waiting for an address, or plugging in a destination computer ID or address into a log-on screen. As a common example, in order to log onto a web page on the Internet, one must enter a user webpage address representation. In order to send e-mail to an entity, one must type in a user's e-mail address, or enter it by clicking an icon, and then send a message to that user.

In view of the busy schedule of many business personnel, including particularly executives, and the desirability of enabling more casual communications, it would be desirable if an entity could simply begin speaking to another entity and have the voice connection made automatically and immediately, without a cumbersome addressing process and attendant delays. In such a scenario, a "virtual presence" is established because the calling party can simply begin speaking to the called party as if the called party were standing in the same room.

SUMMARY OF THE INVENTION

The above and other problems of the prior art are solved and a technical advance is achieved in accordance with the present invention which relates to a technique of establishing a virtual presence. A calling terminal includes a memory for storing incoming speech and a signal processor that processes that incoming speech in order to ascertain the identity and address of a party to be called.

When a calling party desires to establish audio communications with a second user, the calling party simply begins speaking, mentioning the called party's name first. A digital signal processor is configured with speech recognition, and promptly recognizes the name of the party being called.

As soon as the party to be called is identified, a virtual circuit is automatically established and communication takes place. Moreover, the initial speech segment utilized to determine the called party (destination entity) is buffered for an amount of time sufficient to account for the delay caused by the signal processor in recognizing the destination entity from the incoming speech segment. The transmitted speech is delivered using pitch corrected speech control until the voice stream is caught up to the calling party. The automatic pitch corrected speech control is then eliminated, and normal speech transmission mode is utilized.

In other embodiments, the pitch corrected speech control may occur in a network server or elsewhere in the system, and the system may include different authorization levels which define particular users that may communicate via a virtual presence with other particular users.

In other embodiments, the buffer storage and/or signal processing and/or addressing may occur in a network element, thus minimizing the terminal cost and complexity. Additionally, if multiple parties may access the same calling terminal, then the DSP may also be used to identify the calling party. This information may be used as part of determining the address of a party to be called.

DETAILED DESCRIPTION OF THE PREFERRED EMBODIMENT

Figure 1:
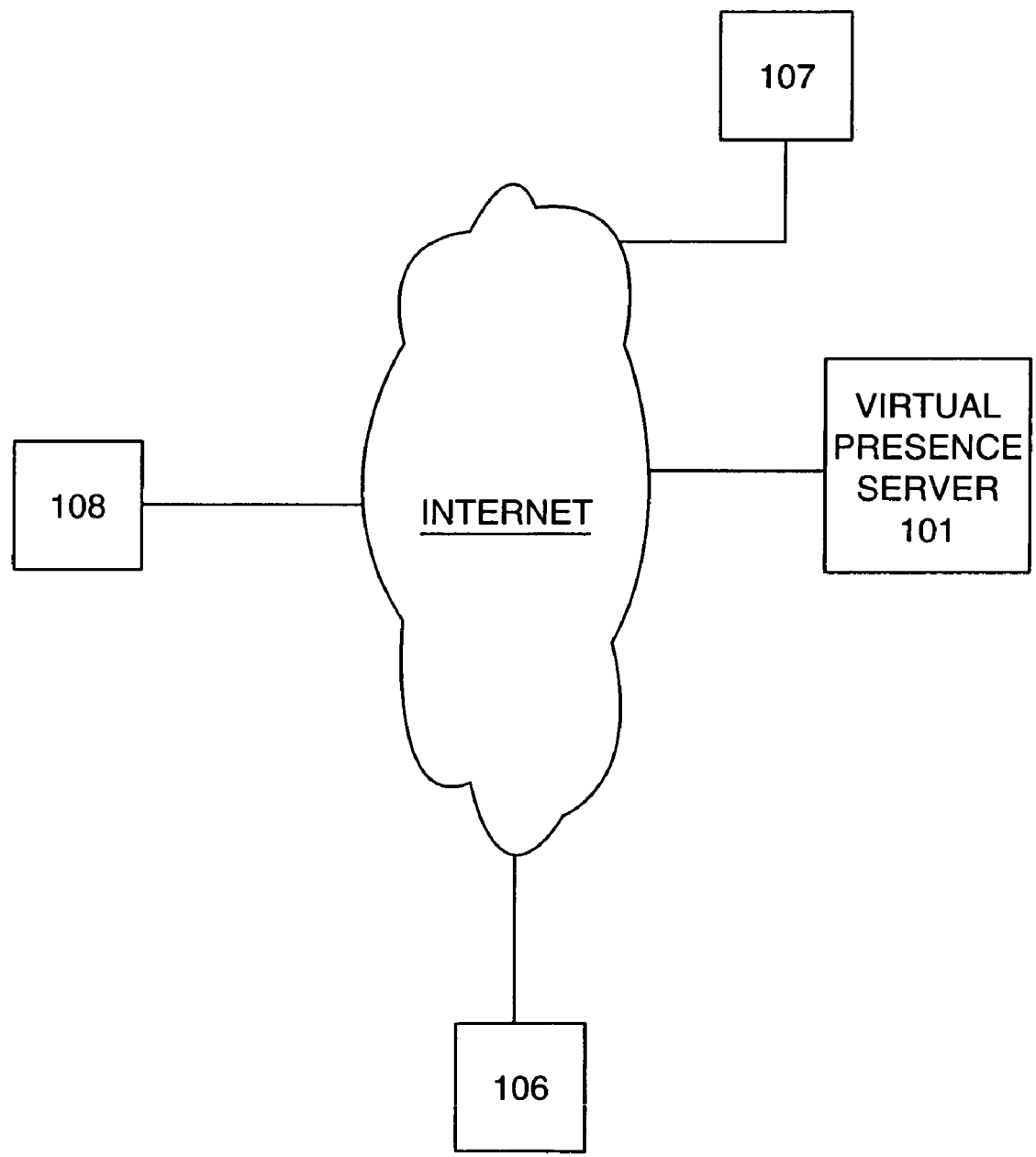
FIG. 1 shows a conceptual diagram of a plurality of terminals interconnected via Internet.

FIG. 1 shows a conceptual diagram of a plurality of terminals interconnected via an exemplary data network, shown as the Internet in FIG. 1. The terminals 101, 106, 107, 108 communicate over the Internet in a conventional fashion using packet switching techniques. Additionally, voice and fax may be transmitted over the Internet by compressing same and utilizing the standard data communications protocols. If the compression algorithms and traffic load on the Internet are reasonable, then the end users of an audio connection will believe that there is a conventional circuit switched connection between them.

In order to facilitate the virtual presence, it is desirable to eliminate the need for an initial call set-up in order to establish the virtual circuit. More accurately, it is desirable to create a situation where this initial call set-up period is invisible to the parties to the connection.

Figure 2:
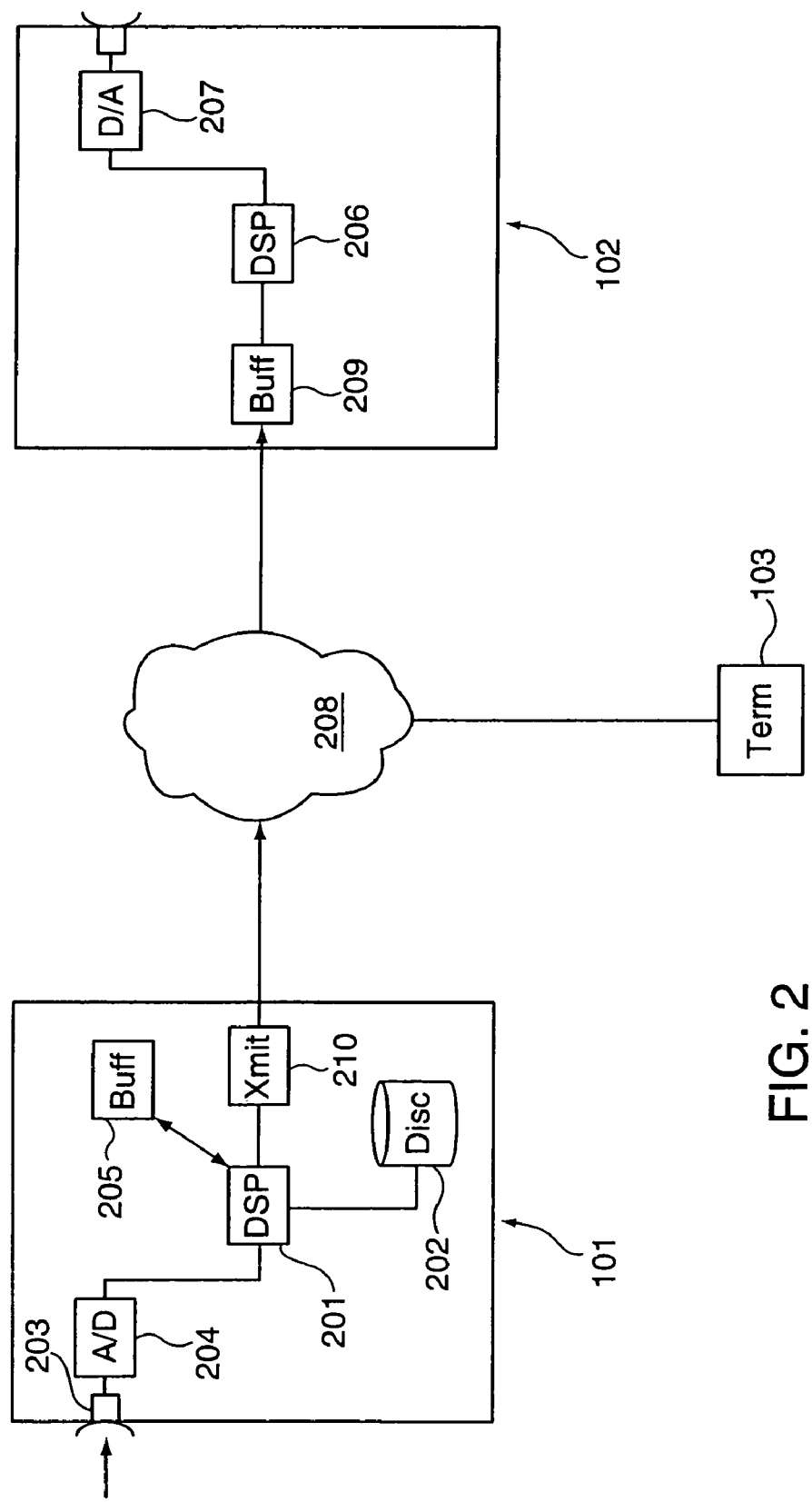
FIG. 2 shows a functional diagram of an exemplary user terminal for implementing preferred embodiment of the present invention.

FIG. 2 shows an exemplary terminal for implementing the present invention in order to render invisible the initial call set-up phase of any call. The apparatus of FIG. 2 comprises a processor 201 installed within a terminal 101 and connected to a exemplary storage disc 202 as shown. The processor performs multiple functions or algorithms as described.

In operation, an audio signal from audio terminal 203 arrives at A to D converter 204 for digitization. The digital audio signal is accepted into buffer 205 via the processor 201.

The initial audio stream is saved to buffer 205 by processor 201 while a connection is being established. Processor 201 is programmed to analyze the beginning portion of the speech in order to detect a destination name. The names of all potential called parties are permanently stored on disc 202, but are ideally read into the working memory (not shown) of processor 201 during operation of the system.

As the processor recognizes the initial portion of the speech, it compares a name or other identifier such as "brother", "mom", "emergency" created by the user or may recognize control or defaults for destinations in that initial portion of the speech to a plurality of prestored records and determines the destination for the speech. The initial packets of speech then begin being transmitted to that destination from transmitter 210, each being sent with the appropriate address in accordance with the protocol of the network.

The prestored records with which the initial incoming speech is compared are generated off line. The user may speak into the system, giving a list of the names of each of the users that he or she may desire to call. The list is then displayed so that the user may enter a network address for each. Hence, a miniature routing table is generated. Of course, the table maybe updated as needed. The table may also be generated from a pre-existing list of names the user may have shared or be sharing.

Returning to the initial speech segment that is entered when it is desired to set up a call, the first several packets are transmitted out of transmitter 210 faster than they arrive. This system allows for the network to "catch up" for the time that the processor 101 takes to perform the speech recognition. More specifically, consider that a user of terminal 201 desires to communicate with a remote user named "Bob" in order to ask if Bob is available for a meeting at 10:00 a.m. The user of terminal 101 simply begins speaking with the sentence "Bob, are you available for a meeting at 10 am." As the audio stream is received through A to D converter 204, it is digitized and stored at buffer 205.

As buffer 205 is filled with data, the data is sent to processor 201. A speech recognition algorithm is executed by processor 201 and the name Bob is extracted therefrom. Bob is stored on the predefined list in the working memory of Processor 201, and is matched through a table look-up process to a particular destination. That destination may translate, in the exemplary case of the Internet, to an Internet address. The particular addressing scheme and translation details are not critical to the present invention, and other possibilities may exist as well. In general transmitter 210 interfaces to any given network to send addressing and complete a connection to terminal 102.

As soon as the appropriate address is decoded so that the destination can be assigned, processor 201 sends that information to the network protocol portion of the system 208. Additionally, buffer 205 upon command from processor 201 then begins sending the packets through transmitter 210 and out onto the data network. The network protocol may include items such as adding packet headers, performing network encoding or modification, or any other conventional techniques. These steps are performed prior to transmission.

At the receiving end, terminal 102 receives the media stream which initially is arriving faster than realtime due to the contents of buffer 205 being dumped over the connection. The stream is stored in buffer 209 and output through processor 206 to D/A 207 using a pitch corrected speed control (PCSC) algorithm running on processor 206. The PCSC allows the media to be output faster than real time until the buffer 209 is empty and then the media can be output normally. The rate of output may be made dependent upon the amount of media in buffer 209 thus only speeding up the output when necessary.

Another implementation puts the PCSC algorithm in processor 201. In this implementation, processor 201 waits until a connection is established and then manages the accelerated streaming of media to the called party using its own PCSC capability. This implementation allows terminal 101 to connect to a device 103 that lacks the processor and special programming to implement virtual presence.

Figure 3:
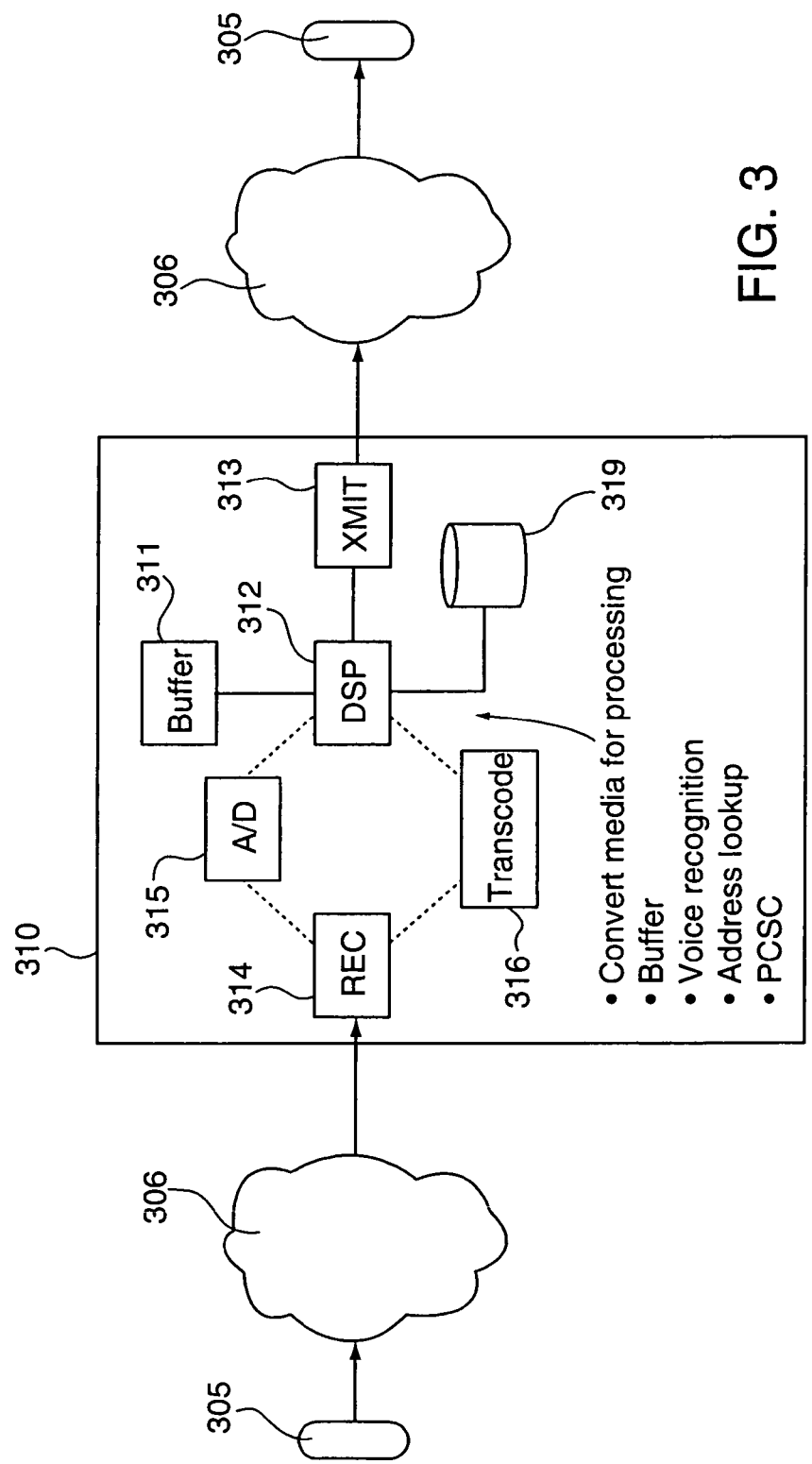
FIG. 3 is an additional embodiment of the present invention.

A third implementation is the network based approach, a centralized server system can be utilized to perform the translations, buffering speech recognition and speech coded. An exemplary such implementation is shown in FIG. 3. The arrangement of FIG. 3 utilizes a data network 306 to interconnect to terminals 305 and 310. In the arrangement of FIG. 3, both the sending and receiving terminals 305 and 310 respectively, may be "dumb" in that all of the required processing is performed by a network server 310. A network server 310 includes a buffer 311, a processor 312, transmitter and receiver 313 and 314 respectively, and an A–D converter and translator 315 and 316.

In operation, signals are received from a network thru receiver 314, and then are decoded for processing by processor 312. Such decoding may involve either A–D conversion or translation between digital codes such as G723, G729, etc. In either event, the input to processor 312 is a standard digital signal and pulse code modulation (PCM) format. Any compression, coding, error correction, etc. added by the network 306 is removed prior to the data being processed.

Processor 312 then extracts the destination by performing speech recognition as previously described with respect to the other approaches. The address look-up is performed utilizing the pre-stored table on storage device 319, and the pitch corrected speech control may be implemented in a manner similar to that described above.

Accordingly, the PCSC is utilized only for an amount of time required to catch up from any delay, and is then switched off so that the speech is conveyed through the network without any speed control. Therefore, the remote user (i.e. the called party) simply hears the speech as normal, except for the first extremely small portion which is a little bit faster than it was generated, but which is likely undetectable due to the pitch correction. Moreover, if the user of terminal 101 stops speaking, then the "catch up" can be done by simply compressing the first block of silence.

It is noted that the signal processing functionality, such as the extraction of the destination and the pitch corrected speed control may be performed at a network server rather than in the originating audio terminal. This arrangement may be beneficial in systems wherein it is desirable to keep the audio terminal low cost, such as a thin client device (e.g., a cell phone).

An additional enhancement to the invention involves sending the address of the originating (i.e. calling) terminal over the network with the audio stream. Such a scheme would allow the receiving terminal to automatically reject items from particular users. Moreover, the rejection can be altered dynamically based upon time of day or other parameters. For example, an executive could determine that immediate "virtual presence" calls will be received from a certain list of personnel (i.e., network addresses) during certain hours, but from a different list of personnel during other hours. Priority schemes are also possible to permit an incoming call arriving from a particular address to interrupt a different call, or to not be permitted to so interrupt the call, depending upon the originating address of the virtual presence called.

Moreover, any spoken name may translate into a plurality of addresses, such that an executive could simply say "software group, we will be meeting at 10 AM". The network would then translate that term into a group of users.

In any of the above systems, the originating party may simply begin speaking to another person, and may have immediate communication. There is no separate setup step to allow for call establishment that is seen by the user.

The foregoing and other embodiments are intended to be covered by the claims appended hereto. The scope of the invention is not limited to the examples given herein, but is intended to cover the variations that would be apparent to those of ordinary skill in the art.

What is claimed:

1. A virtual presence network comprising:
   a plurality of audio terminals;
   a network server communicatively coupled to the plurality of audio terminals, the network server including a processor to process a speech received from an originating terminal, the speech includes a first portion used to determine a destination terminal;
   a first transmission means to establish a virtual circuit between the originating terminal and the destination terminal, while the virtual circuit is being established, to enable a user at the originating terminal to continue to speak a second portion of the speech without a response from a user at the destination terminal; and
   a second transmission means to transmit the speech in a pitch corrected speed control format for a duration determined by the processor, and then automatically switching to a mode that does not include pitch corrected speed control.

2. The network of claim 1, wherein the network server further includes means for determining whether the originating terminal is authorized to transmit to the destination terminal.

3. The network of claim 2, wherein the second transmission means transmits the speech from the originating terminal to the destination terminal only if the originating terminal is authorized.

4. The network of claims 2, wherein the network server further includes an audio generator to convey a message to the originating terminal indicating a lack of authorization to transmit the speech.

5. The network of claims 2, wherein the network server further includes an audio generator to convey a message to the originating terminal indicating that the destination terminal is busy.

6. The network of claim 1 wherein one or more of the plurality of audio terminals includes means for authorizing other audio terminals to transmit the speech.

7. The network of claim 6, wherein the means for authorizing other audio terminals to transmit the speech includes means for dynamically changing authorization parameters.

8. The network of claims 7, wherein the authorization parameters change based upon time of day.

9. A virtual presence network comprising:
   a plurality of audio terminals including at least one originating terminal and at least one destination terminal, wherein a user at the at least one originating terminal initiates a communication by making a speech, the speech includes a first portion and a second portion;
   a signal processor to identify the at least one destination terminal based on the first portion of the speech;
   a first transmitter to establish a virtual circuit for the communication while enabling the user at the at least one originating terminal to continue to speak the second portion of the speech without a response from a user from the at least one designation terminal; and
   a second transmitter to transmit the speech in a pitch corrected speed control format for a duration determined by the processor, and then automatically switching to a mode that does not include pitch corrected speed control.

10. The network of claim 9, wherein the network server to determine whether the originating terminal is authorized to transmit to the destination terminal.

11. The network of claim 10, wherein the network server to transmit the speech received from the originating terminal to the destination terminal only if the originating terminal is authorized.

12. The network of claims 10, wherein the network server further includes an audio generator to convey a message to the originating terminal indicating a lack of authorization to transmit the speech.

13. The network of claims 10, wherein the network server further includes an audio generator to convey a message to the originating terminal indicating that the destination terminal is busy.

14. The network of claim 9, wherein the plurality of audio terminals includes means to authorize other audio terminals to transmit the speech.

15. The network of claim 14, wherein to authorize other audio terminals to transmit the speech includes to dynamically change authorization parameters.

16. The network of claims 15, wherein the authorization parameters change based upon time of day.

* * * * *